US010469452B2

(12) United States Patent
Murray et al.

(10) Patent No.: US 10,469,452 B2
(45) Date of Patent: *Nov. 5, 2019

(54) SECURE COMMUNICATION SYSTEM

(71) Applicant: KLAS TECHNOLOGIES LIMITED, Dublin (IE)

(72) Inventors: Frank Murray, Dublin (IE); Cian Masterson, Dublin (IE); Cathal Daly, Dublin (IE)

(73) Assignee: Klas Technologies Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,468

(22) Filed: Jan. 6, 2017

(65) Prior Publication Data

US 2018/0198760 A1 Jul. 12, 2018

(51) Int. Cl.
*H04L 29/06* (2006.01)
*G06F 9/455* (2018.01)

(52) U.S. Cl.
CPC ...... *H04L 63/0272* (2013.01); *G06F 9/45558* (2013.01); *H04L 63/0428* (2013.01); *H04L 63/105* (2013.01); *G06F 2009/45587* (2013.01); *G06F 2009/45595* (2013.01)

(58) Field of Classification Search
CPC . H04L 63/16; H04L 63/0272; H04L 63/0428; G06F 9/45558; G06F 2009/45595; G06F 2009/45587
See application file for complete search history.

(56) References Cited

U.S. PATENT DOCUMENTS

| | | | | |
|---|---|---|---|---|
| 2011/0264905 A1* | 10/2011 | Ovsiannikov | ..... | H04L 29/08792 713/151 |
| 2015/0019024 A1* | 1/2015 | Sabripour | .......... | G05D 23/1927 700/276 |
| 2016/0048397 A1* | 2/2016 | Morales | ................. | G06F 9/441 713/2 |
| 2017/0126812 A1* | 5/2017 | Singhal | ................ | H04L 67/142 |

\* cited by examiner

*Primary Examiner* — Chau Le
(74) *Attorney, Agent, or Firm* — Vorys, Sater, Seymour and Pease LLP; Vincent M DeLuca

(57) ABSTRACT

A secure communication system includes an outer VPN gateway representative of an outer tunnel for facilitating communication with a black network. The outer VPN gateway includes a first Ethernet port and first program instructions for providing a first layer of encryption. The secure communication system, further includes an inner VPN gateway representative of an inner tunnel for facilitating communication with a red network. The inner VPN gateway comprises a second Ethernet port and second program instructions for providing a second layer of encryption. The secure communication system further includes a coupling bracket for mechanically coupling the inner VPN gateway with the outer VPN gateway, and for facilitating communication between the inner VPN gateway and the outer VPN gateway by interfacing with the first Ethernet port and the second Ethernet port.

16 Claims, 8 Drawing Sheets

SECURE COMMUNICATION SYSTEM

BACKGROUND

The High Assurance Internet Protocol Interoperability Specification (herein after referred to as "HAIPE") is a standard protocol for secure communication specified by the National Security Agency. A red/black architecture 100, as illustrated in FIG. 1, is commonly implemented for securely communicating data. A red-side router 102, also referred to as an inner tunnel, provides access to applications and routes data traffic such as voice, video, email, and web in the form of red signals, or plaintext form. A black-side router 106, or an outer tunnel, encrypts the data traffic, using Advanced Encryption Standard, for example, before the data traffic goes out to a transport network 108 such as the public Internet, a commercial SATCOM network, or a private satellite, and onto a secure network 110. In order to comply with HAIPE, the red/black architecture 100 further includes an NSA certified HAIPE encryption device 104 for providing further encryption and security, based on an algorithm approved by the NSA, before data is sent to the red-side router.

Requiring a HAIPE encryption device 104, however, results in an increase in cost, size, weight, and power requirements for a red/black architecture 100, which may not be feasible when implementing a secure communication infrastructure. In addition, requiring an NSA approved HAIPE encryption device 104 may be perceived as a complex requirement and difficult to implement, which may detour such secure communication infrastructure implementations. Also, it may not be feasible to implement HAIPE compliant communications solutions using commercially available products. Thus, it may be beneficial to be able to remove the HAIPE encryption device 104 while still maintaining compliance with the NSA's HAIPE protocol for secure communication.

As a result, The NSA is developing new ways to leverage emerging technologies to deliver more timely solutions for rapidly evolving customer requirements. The NSA's Commercial Solutions for Classified (hereinafter referred to as "CSfC") Program has been established to enable commercial products to be used in layered solutions protecting classified NSA data. This will provide the ability to securely communicate based on the commercial standards in a solution that can be implemented more timely.

FIG. 2 illustrates an example CSfC architecture 200 in which the red-side router 202 now provides the second layer of encryption that was previously provided by the HAIPE encryption device 104 (now removed).

SUMMARY

The present subject matter relates to a secure communication system including an outer VPN gateway representative of an outer tunnel for facilitating communication with a black network. The outer VPN gateway includes a first Ethernet port and first program instructions for providing a first layer of encryption. The secure communication system further includes an inner VPN gateway representative of an inner tunnel for facilitating communication with a red network. The inner VPN gateway comprises a second Ethernet port and second program instructions for providing a second layer of encryption. The secure communication system further includes a coupling bracket for mechanically coupling the inner VPN gateway with the outer VPN gateway, and for facilitating communication between the inner VPN gateway and the outer VPN gateway by interfacing with the first Ethernet port and the second Ethernet port.

The present subject matter may be a secure communication system including a host computer and a hypervisor for implementing a first and second virtual computer on the host computer. The first virtual computer includes an outer VPN gateway representative of an outer tunnel for facilitating communication with a black network, wherein the outer VPN gateway includes first program instructions for providing a first layer of encryption. The second virtual computer includes an inner VPN gateway representative of an inner tunnel for facilitating communication with a red network, wherein the inner VPN gateway includes second program instructions for providing a second layer of encryption.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
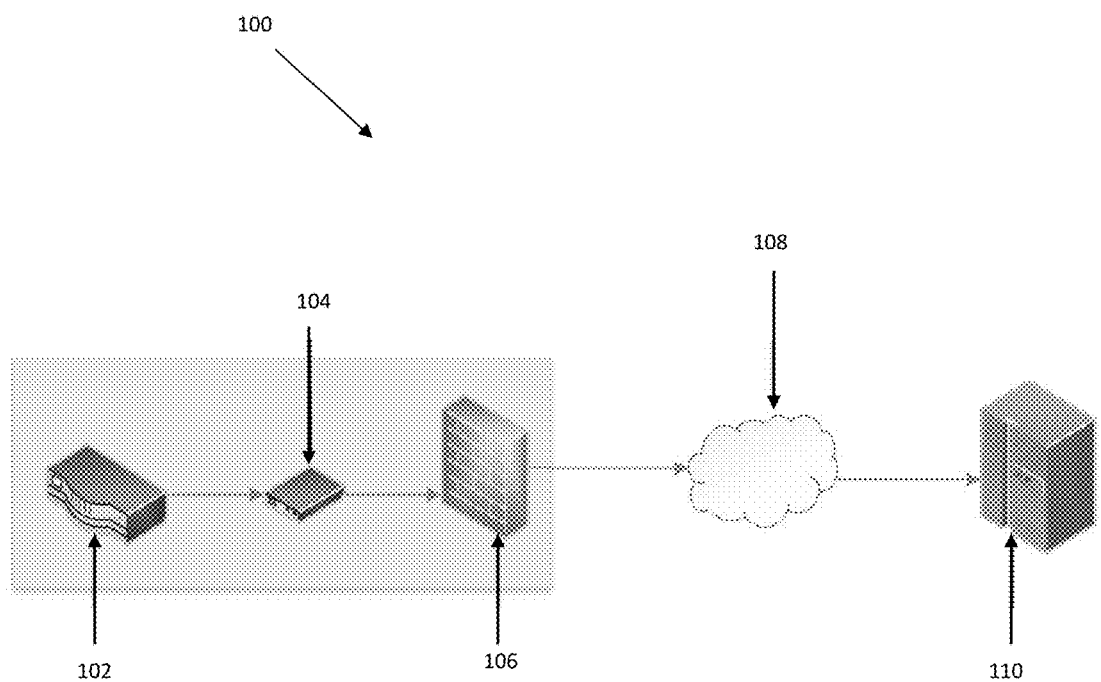
FIG. 1 illustrates an example red/black architecture.
Figure 2:
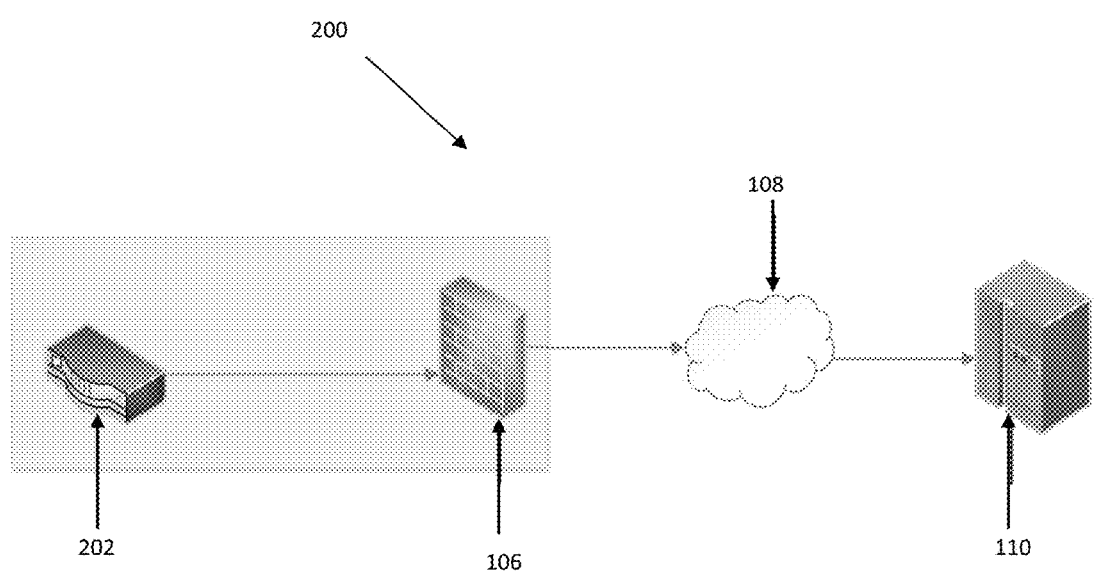
FIG. 2 illustrates an example CSfC architecture.
Figure 3:
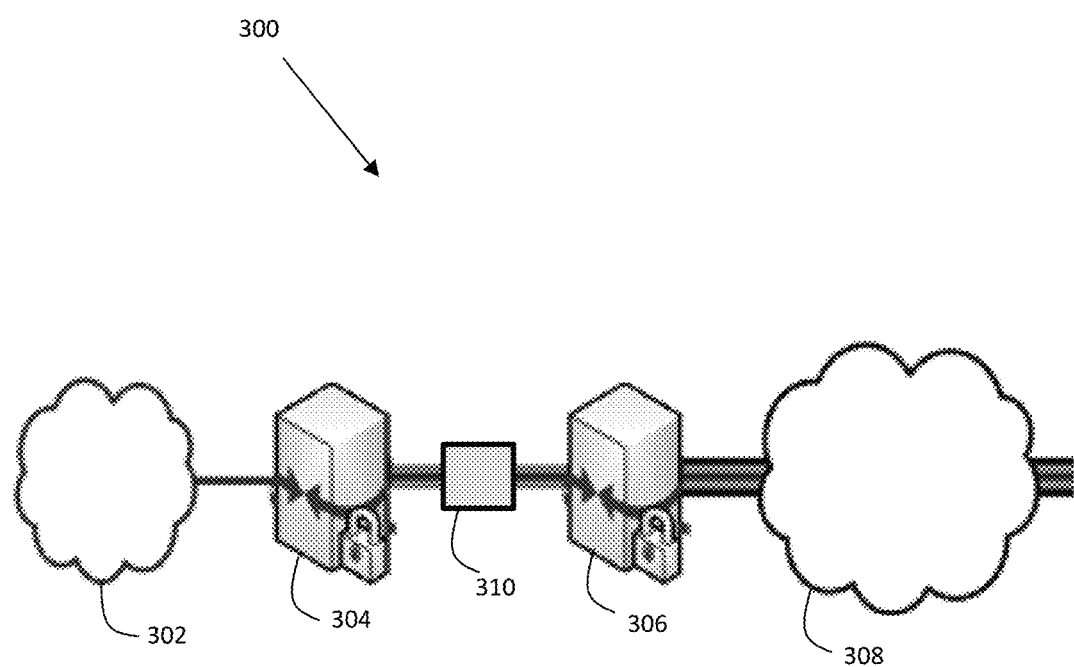
FIG. 3 illustrates an example secure communication system.

FIG. 3 illustrates an example secure communication system 300 that leverages the NSA's defined Virtual Private Network (hereinafter referred to as "VPN") Capability Package VPN CP 3.2 to implement a CSfC solution. Secure communication system 300 includes an inner VPN gateway 304 representing an inner tunnel for facilitating communication with a red network 302 and an outer VPN gateway 306 representing an outer tunnel for facilitating communication with a black network 308. The outer VPN gateway 306 encrypts data before data goes out to the black network while the inner VPN gateway 304 incorporates additional encryption algorithms in order to comply with NSA standards for secure communication. Thus, data on the black network has gone through two layers of encryption. In between the outer VPN gateway 306 and the inner VPN gateway 304 is a gray network 310 wherein data has only been encrypted one time.

Figure 4:
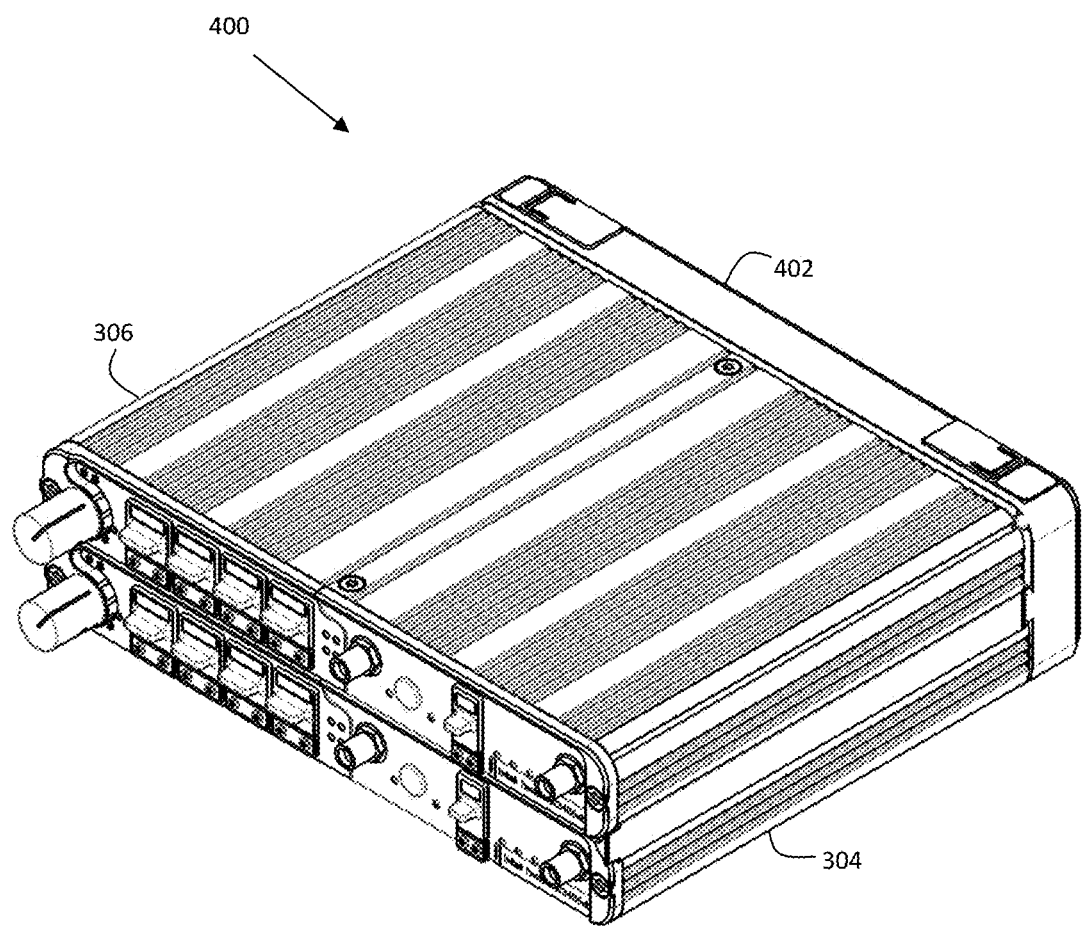
FIG. 4 illustrates an example secure communication system.

In one example, in order to promote convenience, ease of use, and portability, the inner VPN gateway 304 and the outer VPN gateway 306 are mechanically coupled by a bracket 402, as illustrated in FIG. 4. The bracket 402 also facilitates communication between the inner VPN gateway 304 and the outer VPN gateway 306 by engaging their respective Ethernet ports (not shown), thus creating a gray network in between the two. Therefore, two independent hardware components may be combined into a single portable system 400 for providing secure communication in accordance with NSA standards.

It should be appreciated that the secure communication system 300 may incorporate a variety of suitable configurations. For example, the secure communication system 300 may incorporate KLAS Telecom Voyager products. More specifically, in a first option, the outer VPN gateway 306 is implanted using a VoyagerERm based on a Cisco 5915 embedded router while the inner VPN gateway 304 is implemented using a VoyagerVMm Adaptive Security Virtual Appliance ("vASA"). Such a configuration is advantageous in that it offers diverse WAN options including Wi-Fi, Cellular, and Ethernet. Incorporating embedded wireless capabilities in the outer VPN gateway 306 facilitates improved communication capabilities.

In a second option, the outer VPN gateway 306 is implemented using a VoyagerERm based on a Cisco 5915 embedded router while the inner VPN gateway 304 is replaced with a VoyagerESm. Such a configuration also offers the same diverse WAN options as the first example. In addition, this second option provides for a removable configuration feature. In particular, the VoyagerESm includes a removable storage device (not shown). The VoyagerESm retrieves configuration data from the removable storage device at boot time. This offers more flexibility in configuring the secure communication system 300. In addition, since the VoyagerESm is inoperable without configuration data, the removable storage device serves as an ignition key wherein the secure communication system 300 will not boot up with the removable storage device first being inserted. Similarly, the secure communication system 300 will shut down if the removable storage device is removed during operation.

Figure 5:
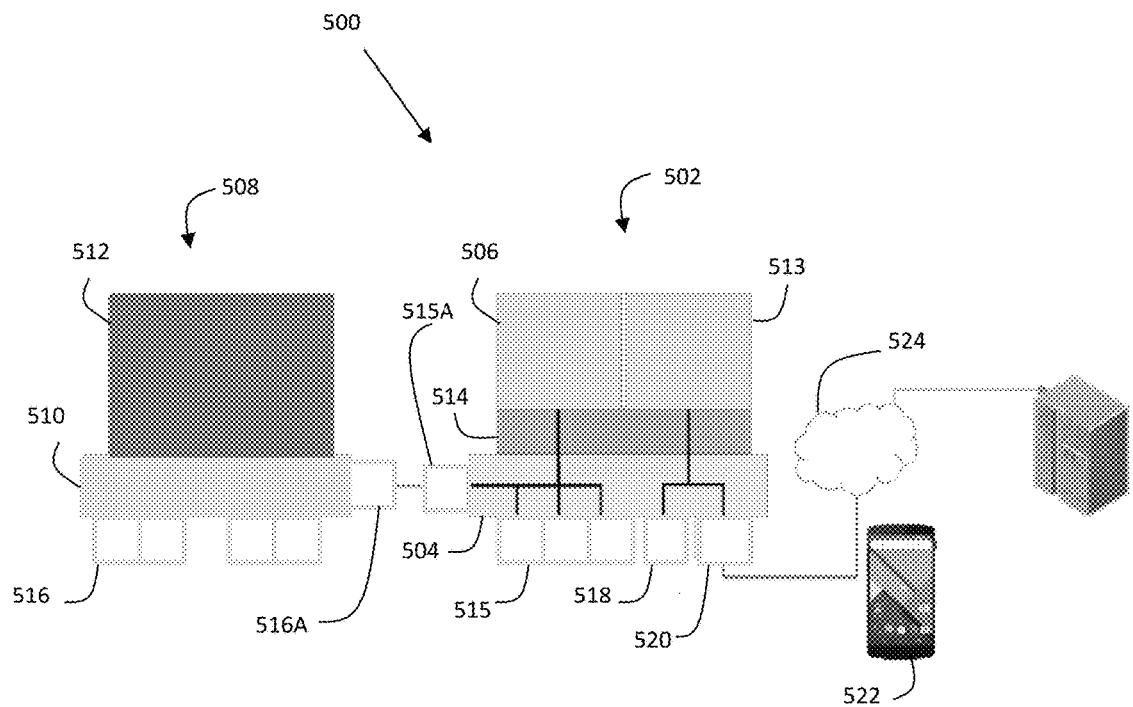
FIG. 5 illustrates an example secure communication system.

As illustrated in FIG. 5, in a third option, an example secure communication system 500 is implemented similarly to the first option but in reverse in order to enable support for multicasting and VoIP. In particular, the outer VPN gateway 502 is implemented using a VoyagerVMm 504, which is built on Adaptive Security Virtual Appliance ("ASAv") 506, while the inner VPN gateway 508 is implemented using a VoyagerERm 510 based on a Cisco 5915 embedded router 512. The outer VPN gateway 502 further includes an operating system 513, such the KIasOS operating system. The outer VPN gateway 502 further includes a hypervisor 514 for managing virtual machine resources. The outer VPN gateway 502 and the inner VPN gateway 508 further include Ethernet ports 5154 and 516, respectively, to facilitate communication in general in between each other via Ethernet ports 515a and 516a specifically.

The outer VPN gateway 502 further includes a removable USB storage device 518 for storing configuration information as well as for serving as an ignition switch.

The outer VPN gateway 502 further includes a tether interface 520 such as a USB tether, for example, to facilitate tethering to a mobile communication device 522 in order to enable transparent communication over a wireless network 524.

Figure 6:
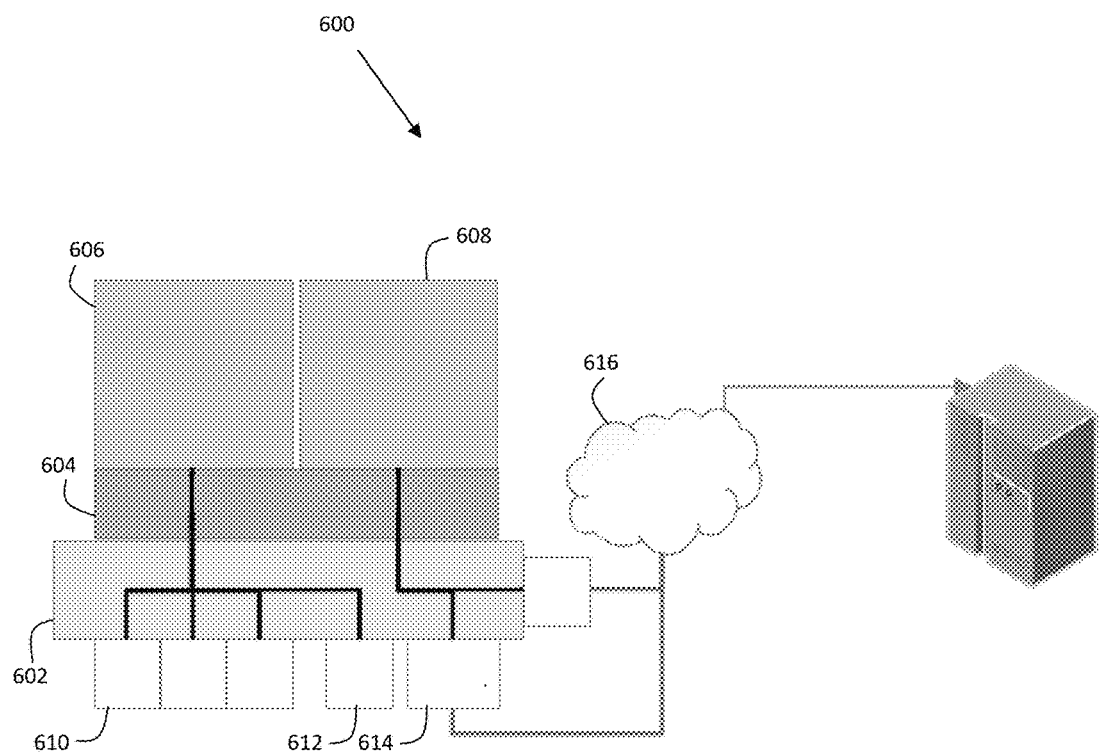
FIG. 6 illustrates an example secure communication system

In one example, as illustrated in FIG. 6, a secure communication system 600 implements both an inner tunnel and an outer tunnel using a single hardware component or host computer. In this example embodiment, both an inner VPN gateway and an outer VPN gateway are implemented using a VoyagerVMm 602. In particular, an operating system, such as the KIasOS, with a hypervisor 604 manages resources of the VoyagerVMm in order to provide two virtual computing environments. In a first virtual environment, an inner VPN gateway is implemented based on a Cisco 5915 embedded router 606. In a second virtual environment, an outer VPN gateway is implemented based on Cisco vASA 608.

It should be appreciated that eliminating hardware component and implementing both an inner tunnel and an outer tunnel using a single hardware component may reduce overall costs of a secure communication system while also proving for increased flexibility and portability.

The secure communication system 600 further includes Ethernet ports 610 to facilitate communication. The secure communication system 600 further includes a removable USB storage device 612 for storing configuration information as well as for serving as an ignition switch.

The secure communication system 600 further includes a tether interface 614 such as a USB tether for example, to facilitate tethering to a mobile communication device (not shown) in order to enable transparent communication over a wireless network 616. In one example, the tether 614 may be replaced with a built-in modem to facilitate wireless communication. For example, the secure communication system 600 may include a built-in Wi-Fi modem or a 3G/LTE modem with a SIM card slot (not shown).

Figure 7:
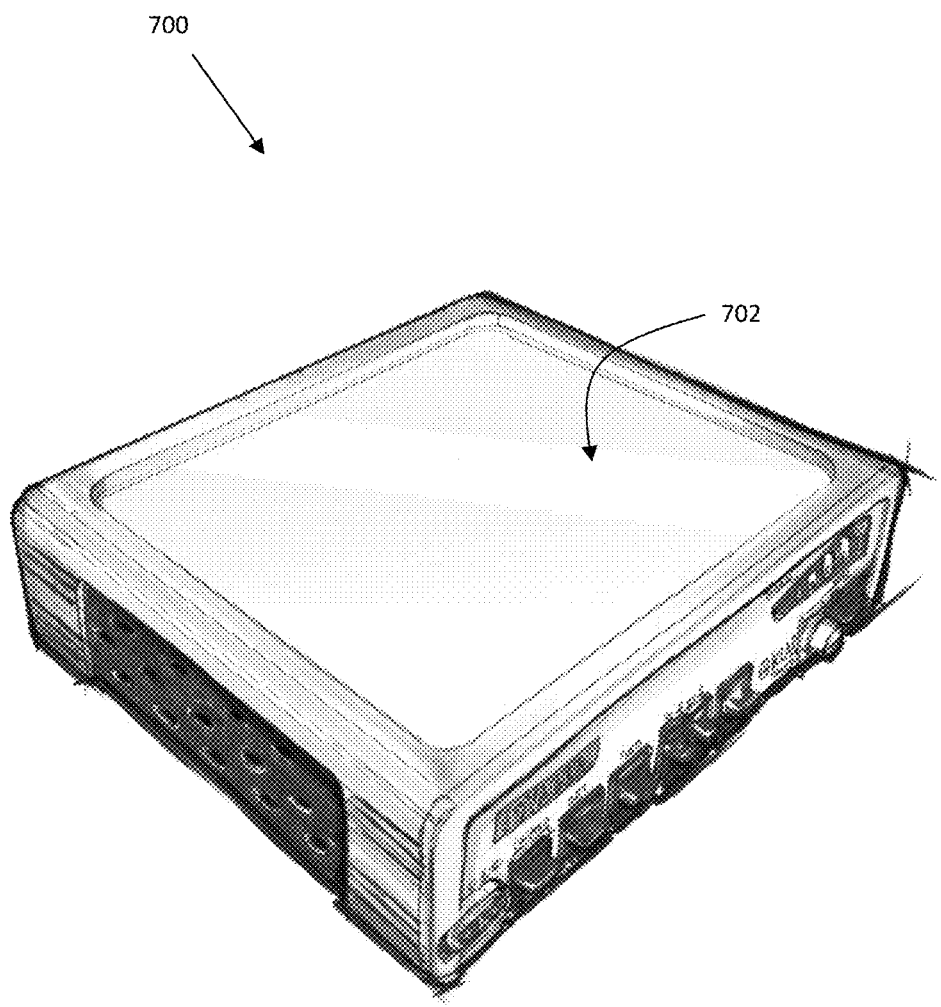
FIG. 7 illustrates an example secure communication system

In one example, as illustrated in FIG. 7, an example secure communication system 700 includes a touch screen interface 702 to facilitate interaction with the secure communication system 700. For example, the touch screen interface 702 may enable a user to perform suitable functions such as selecting and configuring a network, registering with a Wi-Fi, and so on. The touch screen interface 702 may also be configured to provide a user with information, such as a status of a network. It should be appreciated that the touch screen interface 702 can include any suitable type of display such an LCD display.

Figure 8:
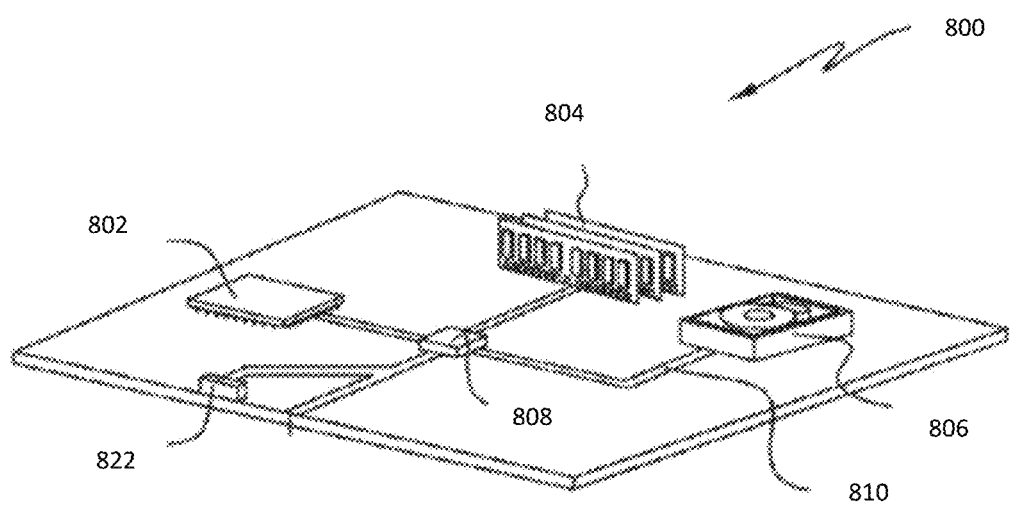
FIG. 8 is a schematic diagram of an example computer for implementing an example secure communication system.

FIG. 8 is a schematic diagram of an example computer 800 for implementing a secure communication system. Computer 800 includes a processor 802, memory 804, a storage device 806, and a communication port 822, operably connected by an interface 808 via a bus 810.

Processor 802 processes instructions, via memory 804, for execution within computer 800. In an example embodiment, multiple processors, along with multiple memories, may be used.

Memory 804 may be volatile memory or non-volatile memory. Memory 804 may be a computer-readable medium, such as a magnetic disk or optical disk. Storage device 806 may be a computer-readable medium, such as floppy disk devices, a hard disk device, optical disk device, a tape device, a flash memory, phase change memory, or other similar solid state memory device, or an array of devices, including devices in a storage area network of other configurations. In one example, the storage device 806 includes dual solid state disk drives. A computer program product can be tangibly embodied in a computer-readable medium such as memory 804 or storage device 806.

While example systems, methods, and so on have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

The invention claimed is:

1. A secure communication system comprising:
   an outer VPN gateway representative of an outer tunnel for facilitating communication with a black network, wherein the outer VPN gateway comprises a first Ethernet port and first program instructions for providing a first layer of encryption;
   an inner VPN gateway representative of an inner tunnel for facilitating communication with a red network, wherein the inner VPN gateway comprises a second Ethernet port and second program instructions for providing a second layer of encryption compliant with National Security Agency (NSA) standards for secure communication; and
   a coupling bracket for mechanically coupling the inner VPN gateway with the outer VPN gateway, and for facilitating communication between the inner VPN gateway and the outer VPN gateway by interfacing with the first Ethernet port and the second Ethernet port.

2. The secure communication system of claim 1, wherein the first and second program instructions are configured to, in combination, are configured to provide encryption complying with the High Assurance Internet Protocol Interoperability Specification for secure communication defined by the National Security Agency.

3. The secure communication system of claim 1, further comprising a removable storage device for storing configuration data.

4. The secure communication system of claim 3, wherein the secure communication system is inoperable without the presence of the removable storage device.

5. The secure communication system of claim 1, further comprising an embedded 3G/LTE modem with a SIM card to facilitate wireless communication.

6. The secure communication system of claim 1, further comprising an embedded Wi-Fi modem to facilitate wireless communication.

7. The secure communication system of claim 1, further comprising a tether interface to enable tethering to an external communication device to facilitate wireless communication.

8. The secure communication system of claim 1, further comprising a touch screen interface for facilitating user interaction.

9. A secure communication system comprising a host computer and a hypervisor for implementing a first and second virtual computer on the host computer:
   wherein the first virtual computer comprises an outer VPN gateway representative of an outer tunnel for facilitating communication with a black network, wherein the outer VPN gateway comprises first program instructions for providing a first layer of encryption;
   a removable storage device attached to the host computer and in communication with one or more of the first virtual computer or the second virtual computer, wherein the one or more of the first virtual computer or the second virtual computer with which the removable storage device communicates does not boot without insertion of the removable storage device and wherein removal of the removable storage device causes the one or more of the first virtual computer or the second virtual computer with which the removable storage device communicates to shut down; and
   wherein the second virtual computer comprises an inner VPN gateway representative of an inner tunnel for facilitating communication with a red network, wherein the inner VPN gateway comprises second program instructions for providing a second layer of encryption compliant with National Security Agency (NSA) standards for secure communication.

10. The secure communication system of claim 9, wherein the first and second program instructions are configured to, in combination, are configured to provide encryption complying with the High Assurance Internet Protocol Interoperability Specification for secure communication defined by the National Security Agency.

11. The secure communication system of claim 9, further comprising an embedded 3G/LTE modem with a SIM card to facilitate wireless communication.

12. The secure communication system of claim 9, further comprising an embedded Wi-Fi modem to facilitate wireless communication.

13. The secure communication system of claim 9, further comprising a tether interface to enable tethering to an external communication device to facilitate wireless communication.

14. The secure communication system of claim 9, further comprising a removable storage device for storing configuration data.

15. The secure communication system of claim 9, further comprising a touch screen interface for facilitating user interaction.

16. A secure communication system comprising:
   an outer VPN gateway representative of an outer tunnel for facilitating communication with a black network, wherein the outer VPN gateway comprises a first Ethernet port and first program instructions for providing a first layer of encryption;
   an inner VPN gateway representative of an inner tunnel for facilitating communication with a red network, wherein the inner VPN gateway comprises a second Ethernet port and second program instructions for providing a second layer of encryption compliant with National Security Agency (NSA) standards for secure communication;
   a removable storage device attached to one or more of the outer VPN gateway or the inner VPN gateway, wherein the attached device does not boot without insertion of the removable storage device and wherein removal of the removable storage device causes the attached device to shut down; and a coupling bracket for mechanically coupling the inner VPN gateway with the outer VPN gateway, and for facilitating communication between the inner VPN gateway and the outer VPN gateway by interfacing with the first Ethernet port and the second Ethernet port.

* * * * *